United States Patent [19]

Maraulja et al.

[11] 3,862,342

[45] Jan. 21, 1975

[54] HIGH PROTEIN CITRUS FOOD PRODUCTS

[75] Inventors: Matthew D. Maraulja, Lakeland; John A. Attaway; Cedric D. Atkins, both of Winter Haven, all of Fla.

[73] Assignee: State of Florida, Department of Citrus, Lakeland, Fla.

[22] Filed: Jan. 30, 1973

[21] Appl. No.: 328,073

Related U.S. Application Data

[63] Continuation-in-part of Ser. No. 14,672, Feb. 26, 1970, abandoned.

[52] U.S. Cl.............. 426/185, 426/190, 426/205, 426/213, 426/229, 426/187
[51] Int. Cl............................................ A23c 23/00
[58] Field of Search ......... 426/185, 190, 192, 187, 426/191, 205, 206, 229, 212, 213, 356, 365, 369

[56] References Cited

UNITED STATES PATENTS

| | | | |
|---|---|---|---|
| 1,767,185 | 6/1930 | Neilsen | 426/187 |
| 1,814,994 | 7/1931 | Wilson | 426/187 |
| 1,925,441 | 9/1933 | Finley et al. | 426/356 |
| 2,450,456 | 10/1948 | Tazewell | 426/185 |
| 2,818,342 | 12/1957 | Ransom | 421/185 |
| 2,859,115 | 11/1958 | Rivoche | 426/185 |
| 3,157,513 | 11/1964 | Alieu | 426/185 |
| 3,174,865 | 3/1965 | Johnston et al. | 416/185 |
| 3,647,476 | 3/1972 | Swisher | 426/185 |
| 3,692,532 | 9/1972 | Shenkenberg et al. | 426/185 |

*Primary Examiner*—Raymond N. Jones
*Assistant Examiner*—Ernest G. Therkorn
*Attorney, Agent, or Firm*—James J. Brown

[57] ABSTRACT

A high protein citrus food product is prepared which has good storage stability and texture by combining a major amount of citrus juice or the equivalent thereof with minor amounts of acid-soluble protein and solubilized starch. The starch is solubilized by heating in the presence of water and, optionally, an enzyme to effect partial hydrolyses. Additional food stabilizers can advantageously be added as well as sweeteners and flavoring components and the final mixture may be processed into a number of forms including dry power and concentrates.

17 Claims, No Drawings

HIGH PROTEIN CITRUS FOOD PRODUCTS

This application is a continuation-in-part of application Ser. No. 14,672, now abandoned filed Feb. 26, 1970.

This invention relates to a novel high protein citrus product comprising a minor amount of protein derived from milk or other sources and a major amount of a citrus juice.

More particularly, this invention relates to a novel high protein citrus product prepared by combining protein material with citrus juice and starch so that the starch is solubilized in a manner such that the product does not separate or otherwise lose its homogeneity during storage.

Various attempts have been made in the past to combine milk protein and citrus juices, however, these attempts have not generally been successful due principally to the fact that the acidity of the citrus juice causes coagulation of the milk protein and separation on standing. For example, U.S. Pat. No. 2,818,352 to Ransom discloses mixing an orange concentrate which has been heavily fortified with sugar and substantial portions of orange peel oil with homogenized milk to produce an orange-milk drink. Thus, the problem of curdling is overcome by simply employing sufficiently concentrated orange essence that the small amount of this concentrate which is used does not effect the acidity of the mixture sufficiently to cause curdling. Nevertheless, the product so obtained lacks stability during long term storage.

Other processes of the prior art have employed various hydrophilic colloids, such as algins, pectins and gelatin as stabilizers to prevent separation of milk protein and citrus juices. As disclosed in U.S. Pat. No. 2,859,115 to Rivoche, however, these milk-citrus products which have been stabilized with hydrophilic colloids are inherently unstable and tend to separate with the heavier food particles settling to the bottom. The Rivoche patent has attempted to eliminate the problems inherent in the use of hydrophilic colloids by the use of a prefabricated gel from these colloids containing alkaline earth metal salts such as calcium carbonate to incorporate citrus particles into milk.

In accordance with the present invention, however, it has been found that a superior food product combining both milk protein and citrus juices, such as, for example, orange, grapefruit, lemon or lime juice, can be prepared having improved storage life and texture and not requiring the addition of various inorganic salts. According to the present invention a major portion of citrus juice is combined with suitable protein material and starch along with a soluble food stabilizer and the mixture then treated to effect mixing and dissolution of the starch. The resulting product is a creamy liquid which is stabilized by the interaction of the soluble protein material and the starch dissolution products and which can be further processed as desired into a number of delicious food preparations.

The sequence in which the various ingredients are combined together according to the present invention is not critical and may be carried out in any convenient fashion. For example, the protein material and starch can be first mixed together and the mixture then treated to effect dissolution of the starch prior to the addition of the citrus juice. Alternatively all of the ingredients including the citrus juice can be combined together initially and then heated to effect solution and combination of ingredients.

The dissolution or partial hydrolyses of the starch into the soluble amylopectin and relatively insoluble amylose fractions and the complexing of these fractions with the milk protein, according to the present invention, is most advantageously effected by boiling the starch in sufficient water for about 10-15 minutes at a temperature of about 210° – 260°F. The necessary water for the complete dissolution of the starch can either be added to the starch-protein mixture and boiling carried out prior to the addition of the citrus juice, or the citrus juice, which will generally contain sufficient water for reaction with the starch, is added to the starch-protein first and the entire mixture boiled. Preferably, however, the water is added to the starch-protein mixture and boiling carried out prior to the addition of the citrus juice since the risk of impairing the flavor of the juice is not thereby encountered. Although the amount of water required for the starch is not critical, it is advisable that about 4 to 8 liters of water be present per 100 grams of starch to ensure complete dissolution as well as complete mixing and solution of the other ingredients.

When relatively high protein and starch levels are used, hydrolyses of the starch can be facilitated by heating of the mixture at a temperature below 140° F. in the presence of about 0.10 to 0.15 percent by weight, based on the starch, of suitable enzymes to effect additional solubilization of the relatively insoluble amylose fraction to soluble maltose. While this partial hydrolysis of the amylose fraction takes place rapidly below 140°F., above this temperature inactivation of the enzyme occurs and the hydrolyses stops. Below starch levels of about 2 percent by weight, the use of enzymes is not necessary, however, according to this invention. Suitable enzymes which can be used to further solubilize the amylose fraction is a $\alpha$-amylose ($\alpha$-1,4-Glucan-4-glucanohydrolase). This heating in the presence of an enzyme can be carried out either as an alternative to or subsequent to heating in water above at 210°-260°F..

While not being bound in the present invention by a particular theory or mechanistic hypothesis, it is believed that the soluble amylopectin starch fraction acts primarily to form a stable complex with the soluble protein, and thereby remains stable when mixed with acid citrus juices. This action of the amylopectin is not adversely affected by the use of the $\alpha$-amylose enzyme since this enzyme is specific for the amylose during the short reaction time of the heating procedure (about 5-15 minutes, preferably 10-15 minutes).

While the amount of full strength citrus juice employed in the high protein citrus products of the present invention is at least 50 percent by weight based on the total weight of the liquid composition, the amounts most advantageously used will depend to a large extent, on the type of citrus fruit, its acidity and the Brix of the particular juice. About 85 to 92 weight percent — 14°Brix orange juice or the equivalent thereof is most advantageously employed to prepare the high protein-orange juice food product of the present invention. This juice can be, for example, the single strength orange juice or the corresponding amount of a 60° – 80° Brix concentrate. Where other high acid citrus fruit juice such as grapefruit juice are employed, approximately 54 to 57 weight percent of 6 to 14 Brix juice is preferred Soluble protein material is employed in amounts of about 1 to 6 percent by weight preferably about 4–5 percent by weight and starch in amounts of about 0.5 to 3 percent by weight according to the present invention. Although starch levels of 2.0–3.0 percent by weight are desirable to provide the necessary amylopectin fraction for stabilizing protein content above about 3 percent by weight, often only about 1 percent by weight starch is required to produce a stable product having a satisfactory texture and viscosity. Soluble food stabilizers are incorporated into the present composition in amounts of about 0.1 to 1 percent by weight to improve texture and viscosity and further help in preventing separation on storage although the amount used varies somewhat with the amount of protein incorporated into the mixture. Accordingly about 0.1 weight percent stabilizer is usually sufficient when only about 1 weight percent protein material is employed, but about 1 weight percent is generally required when the protein content approaches about 6 weight percent.

Suitable protein materials which are used in the present invention are glyco proteins derived from milk or other sources such as soya beans and which are acid soluble in the pH range of about 2 to 4 or, in other words, in the acid range found with most full strength citrus juices. A particularly suitable acid soluble milk protein, for example, is a modified casein derived from milk and soluble in the pH range of 2 to 3.2 known under the tradename "Savortaone 601."

The various food stabilizers which can be employed in the present invention include hydrophilic colloidal stabilizers commonly known in the prior art such as gum arabic, gelatin, and pectin, however, particularly suitable stabilizers have been found to be anionic polymers derived from cellulose, which are water soluble and tolerant of low pH's encountered in citrus foods, and, in particular, sodium carboxymethyl-cellulose polymers having a low viscosity and a degree of carboxymethyl substitution of about 0.65–0.85 D.S.

Either before or subsequent to mixing and heating of the starch various sweeteners can be added in appropriate amounts to assure a final product having a desired flavor. Various artifical sweeteners as well as natural sweeteners such as dextrose, sucrose or fructose can be employed in amounts of about 2 to 9 percent by weight based on the final composition. A particularly preferred sweetener, however, is corn syrup. Inasmuch as the flavoring of the final product can vary considerably, flavor adjustment can be further made by incorporating, preferably subsequent to boiling, blends of citrus essence oils, cold pressed oils and vanilla extract. If desired, oils and fruit flavor extracts of various fruits can be combined in order to provide more exotic flavors. Ordinarily, the combined amount of various extracts and flavors containing oils will be about 0.02 to 0.08 weight percent.

The food product obtained according to the present invention is a nutritious, good tasting liquid which can have a protein content approximating that of whole milk. Depending, however, on the particular composition, the viscosity of the product may vary somewhat and it is often desirable to adjust to a viscosity of at least about 40 cps at 80°F., for example, by removing excess water.

Subsequent to the heating of the starch and mixing of the various ingredients including sweeteners, essence oils and extracts, various alternative procedures can be advantageously employed depending upon the form of final product which is desired. For example, the resulting high protein citrus drink which has creamy texture can be dried at a temperature of about 165° to 205°F to yield dried instant protein-citrus crystals which can be packaged as a non-hygroscopic powder to which hot water can be added for an instant high protein citrus food. It is another feature of the present invention that the creamy, high protein citrus product which is obtained by the steps heretofore described can be stabilized and reduced to one half volume by heating at about 165° to 205°F. until sufficient water has been removed and then placed in sealed containers to obtain a two fold instant high protein citrus fruit base which can be reconstituted by the addition of one volume of hot or cold water to each volume of the concentrate. If desired, of course, bases of other concentration can be prepared by removing additional or less water prior to sealing in containers.

The following examples illustrate satisfactory food products which have been prepared according to the present invention.

EXAMPLE 1

12 quarts of distilled water were added to a steam jacketed kettle and while stirring, the following ingredients slowly added:
- 250 grams of milk protein material containing 89 weight percent glycoprotein and soluble in the pH range 2–3.2
- 210 grams of starch
- 105 grams of low viscosity sodium carboxymethylcellulose having a degree of carboxymethyl substitution of 0.65–0.85 D.S.

The mixture was slowly heated using steam pressures of 25 to 28 lbs PSI until the mixture had been brought to a boil. Boiling was then maintained for 15 minutes to insure the complete hydrolysis of the starch and complete solution of the sodium carboxymethylcellulose polymer. During this period of time a temperature of 210° to 225°F. was maintained. The mixture was then transferred to a larger tank and while stirring, a mixture of 2 quarts of distilled water and 1,281 grams of corn syrup added, followed by 3 quarts of 68°Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120°F. at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Wt. in Grams | Percent by Weight |
|---|---|---|
| 18.45 Qts. of 14.0° Brix juice (3 qts. 68° Brix conc. + 15.45 qts. water) of oranges | 18,472.0 | 90.89 |
| Milk protein material: Milk protein | 228 | 1.12 |
| Ash and moisture | 22 | |
| Starch | 210 | 1.03 |
| Sodium carboxymethylcellulose | 105 | .52 |
| Corn syrup | 1,281.0 | 6.30 |
| Orange essence oil (.009%) | 2 | |
| Cold-pressed orange oil (.009%) | 2 | 0.03 |
| Vanilla extract (.013%) | 3 | |
| | 20,325 | |

EXAMPLE 2

12 quarts of distilled water were added to a steam jacketed kettle and while stirring, the following ingredients slowly added:

- 500 grams of milk protein material containing about 89 percent glycoprotein and soluble in the pH range 2–3.2
- 210 grams of Starch
- 105 grams of low viscosity sodium carboxymethylcellulose having a degree of carboxymethyl substitution of 0.65–0.85 D.S.

The mixture was slowly heated using steam pressures of 25 to 28 lbs. PSI until the mixture had been brought to a boil. Boiling was then maintained for 15 minutes to insure the complete hydrolysis of the starch and complete solution of the sodium carboxymethylcellulose polymer. During this period of time a temperature of 210° to 225°F was maintained. The mixture was then transferred to a larger tank and while stirring, a mixture of 2 quarts of distilled water and 1,281 grams of corn syrup added, followed by 3 quarts of 68°Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120°F at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Weight in Grams | Percent by Weight |
| --- | --- | --- |
| 18.45 Qts. of 14.0° Brix juice (3 qts. 68° Brix conc. + 15.45 qts. water) of orange | 18,472.0 | 89.78 |
| Milk Protein Material: |  |  |
| Milk protein | 445 | 2.16 |
| Ash and Moisture | 55 | .27 |
| Starch | 210 | 1.02 |
| Sodium carboxymethylcellulose | 105 | .51 |
| Corn syrup | 1,281.0 | 6.23 |
| Cold-pressed orange oil (.009%) | 2 | 0.03 |
| Orange essence oil (.009%) | 2 |  |
| Vanilla extract (.013%) | 3 |  |
|  | 20,575 |  |

EXAMPLE 3

12 quarts of distilled water were added to a steam jacketed kettle and while stirring, the following ingredients slowly added:

- 710 grams of milk protein material containing about 89 percent glycoprotein and soluble in the pH range 2–3.2
- 210 grams of Starch
- 105 grams of low viscosity sodium carboxymethylcellulose having a degree of carboxymethyl-substitution of 0.65 – 0.85 D.S.

The mixture was slowly heated using steam pressures of 25 to 28 lbs PSI until the mixture had been brought to a boil. Boiling was then maintained for 15 minutes to insure the complete hydrolysis of the starch and complete solution of the sodium carboxymethylcellulose polymer. During this period of time a temperature of 210° to 225°F. was maintained. The mixture was then transferred to a larger tank and while stirring, a mixture of 2 quarts of distilled water and 1,281 grams of corn syrup added, followed by 3 quarts of 68° Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120°F. at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Weight in Grams | Percent by Weight |
| --- | --- | --- |
| 18.45 Qts. of 14.0° Brix juice (3 qts. 68° Brix conc. + 15.45 qts. water) of oranges | 18,472.0 | 88.88 |
| Milk Protein Material: |  |  |
| Milk protein | 647 | 3.11 |
| Ash and moisture | 63 | .30 |
| Starch | 210 | 1.01 |
| Sodium carboxymethylcellulose | 105 | .51 |
| Corn syrup | 1,281.0 | 6.16 |
| Orange essence oil (.009%) | 2 |  |
| Cold-pressed orange oil (.009%) | 2 | .03 |
| Vanilla extract (.013%) | 3 |  |
|  | 20,785 |  |

EXAMPLE 4

12 quarts of distilled water were added to a steam jacketed kettle and while stirring, the following ingredients slowly added:

- 1,000 grams of milk protein material containing about 89 percent glycoprotein and soluble in the pH range 2–3.2
- 210 grams of Starch
- 105 grams of low viscosity sodium carboxymethylcellulose having a degree of carboxymethyl substitution of 0.65–0.85 D.S.

The mixture was slowly heated using steam pressures of 25 to 28 lbs. PSI until the mixture had been brought to boil. Boiling was then maintained for 15 minutes to insure the complete hydrolysis of the starch and complete solution of the sodium carboxymethylcellulose polymer. During this period of time a temperature of 210° to 225°F was maintained. The mixture was then transferred to a larger tank and while stirring, a mixture of 2 quarts of distilled water and 1,281 grams of corn syrup added, followed by 3 quarts of 68° Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120°F at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Weight in Grams | Percent by Weight |
|---|---|---|
| 18.45 Qts. of 14.0° Brix juice (3 qts. 68° Brix conc. + 15.45 qts. water) of oranges | 18,472.0 | 87.65 |
| Milk Protein Material: | | |
| Milk protein | 890 | 4.22 |
| Ash and Moisture | 110 | .52 |
| Starch | 210 | 1.00 |
| Sodium carboxymethylcellulose | 105 | .50 |
| Corn syrup | 1,281.0 | 6.08 |
| Orange essence oil (.009%) | 2.2 | |
| Cold-pressed orange oil (.009%) | 2.2 | 0.35 |
| Vanilla extract (.013%) | 3.0 | |
| | 21,075.4 | |

EXAMPLE 5

The orange juice-high protein food product of Example 4 was prepared except that, subsequent to addition of the essence oil, cold-pressed oil and vanilla extract, the beverage was dried to a crytalline solid by heating at a temperature of about 165° – 200°F.

EXAMPLE 6

12 quarts of distilled water were added to a steam jacketed kettle and while stirring, the following ingredients slowly added:
  1,230 grams of milk protein material containing about 89 percent glycoprotein and soluble in the pH range 2-3.2
  205 grams of Starch
  105 grams of low viscosity sodium carboxymethylcellulose having a degree of carboxymethyl substitution of 0.65 – 0.85 D.S.

The mixture was slowly heated using steam pressures of 25 to 28 lbs. PSI until the mixture had been brought to a boil. Boiling was then maintained for 15 minutes to insure the complete hydrolysis of the starch and complete solution of the sodium carboxymethylcellulose polymer. During this period of time a temperature of 210° to 225°F was maintained. The mixture was then transferred to a larger tank and while stirring, a mixture of 2 quarts of distilled water and 1,281 grams of corn syrup added, followed by 3 quarts of 68° Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120° F. at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Weight in Grams | Percent by Weight |
|---|---|---|
| 18.45 Qts. of 14.0° Brix juice (3 qts. 68° Brix conc. ° 15.45 qts. water) of oranges | 18,472.0 | 86.74 |
| Milk Protein Material: | | |
| Milk protein | 1,095 | 5.14 |
| Ash and moisture | 135 | .63 |
| Starch | 205 | .96 |
| Sodium carboxymethylcellulose | 105 | .49 |
| Corn syrup | 1,281.0 | 6.01 |
| Orange essence oil (.009%) | 2 | |
| Cold-pressed orange oil (.009%) | 2 | 0.03 |
| Vanilla extract (.013%) | 3 | |
| | 21,270.0 | |

EXAMPLE 7

12 quarts of distilled water were added to a steam jacketed kettle and while stirring, the following ingredients slowly added:
  1,450 grams of milk protein material containing about 89 percent glycoprotein and soluble in the pH range 2-3.2
  205 grams of Starch
  100 grams of low viscosity sodium carboxymethylcellulose having a degree of a carboxymethyl substitution of 0.65 – 0.85 D.S.

The mixture was slowly heated using steam pressures of 25 to 28 lbs. PSI until the mixture had been brought to a boil. Boiling was then maintained for 15 minutes to insure the complete hydrolysis of the starch and complete solution of the sodium carboxymethylcellulose polymer. During this period of time a temperature of 210° to 225°F. was maintained. The mixture was then transferred to a larger tank and while stirring, a mixture of 2 quarts of distilled water and 1,281 grams of corn syrup added, followed by 3 quarts of 68° Brix concentrate and 1.45 quarts of water. Finally, 2.5 ml. of Valencia orange essence oil, 2.5 ml. of Valencia orange cold-pressed oil and 3.0 ml. of vanilla extract were added for flavor adjustment. The product temperature was below 120°F at this point. The beverage was then passed through a heat exchange unit and the orange juice constituent heat stabilized at 185° to 210°F., filled into 12 oz. cans, cooled under a water spray and stored at approximately 40°F.

Ingredients by Weight Percent

|  | Weight in Grams | Percent by Weight |
|---|---|---|
| 18.45 Qts. of 14.0° Brix Juice (3 qts. 68° Brix conc. + 15.45 qts. water) of oranges | 18,472.0 | 85.87 |
| Milk Protein Materials: |  |  |
| Milk protein | 1,290.0 | 6.00 |
| Ash and moisture | 160.0 | 0.74 |
| Starch | 205.0 | 0.95 |
| Sodium carboxymethylcellulose | 100.0 | 0.46 |
| Corn syrup | 1,281.0 | 5.95 |
| Orange essence oil (.009%) | 2.1 |  |
| Cold-pressed orange oil (.009%) | 2.1 | 0.03 |
| Vanilla extract (.013%) | 3.0 |  |
|  | 21,515.2 |  |

EXAMPLES 8 AND 9

The orange juice-high protein food products of examples 1 and 6 were prepared except that to the mixtures of examples 1 and 6 of distilled water, milk protein material, starch, and sodium carboxymethylcellulose, 0.26 grams of alpha-amylose was added to the unheated mixture when 210 grams of starch was used, and 0.25 grams added when 205 grams of starch was used. The mixtures of examples 1 and 6 were then slowly heated using steam pressure of 25 to 28 lbs. PSI until a temperature of 140°F. was reached. During this time, approximately 12 to 15 minutes, the enzyme alpha-amylase, had partially hydrolyzed the starch fraction amylose to maltose. The mixture was then brought to boil and boiling maintained for 15 minutes at 210° to 225°F. to deactivate the enzyme and insure the complete solution of the sodium carboxymethylcellulose polymer.

The remainder of the processing procedures were then continued as heretofore described.

EXAMPLE 10

The progress of the reaction and the extent of the hydrolysis of the starch during the boiling procedure was determined using the iodine test to quantitatively measure the decrease in starch content in the solution. The milk protein was omitted from the solution during the test for hydrolysis of the starch since the presence of proteins interfers with the iodine test.

Eight and one-fifth liters of distilled water were added to a steam-jacketed kettle and while stirring, 210 grams of starch were slowly added. The mixture was heated, while stirring, to 210°F to effect complete dissolution of the starch and the mixture then cooled to 80°F and a sample removed for analysis for starch content. At this point 0.26 grams of alpha-amylase enzyme was added and the mixture was heated slowly using steam pressure of 25 lb. PSI. Samples were removed at 5 minute intervals and the solution temperature recorded. As samples were removed they were placed in a boiling water bath for 5 minutes to inactivate the enzyme and then were cooled. The last sample was removed at a mixture temperature of 211°F at the end of the 35 minute heating time. The cooled samples together with the sample of starch solution prior to enzyme treatment were diluted with distilled water using a 1 to 160 dilution for colorimetric analysis.

Ten ml. samples of the diluted starch solutions were transferred to test tubes and 0.5 ml. of 0.005 molar iodine solution was added to each sample to develop the blue coloration. Readings were immediately taken using a Fischer Electrophotometer and a 425 mu wavelength filter. The results of the test are shown in Table 1. The progress of the hydrolysis is shown by the decrease in starch content from 0.0224 grams per ml. of the untreated solution down to 0.0166 grams per ml. of sample number 4 which was subjected to enzyme treatment for 15 minutes up to a temperature of 133°F. Samples 5 through 8 show no decrease in starch content, indicating that the enzyme was inactivated between 133°F and 146°F and that hydrolysis had stopped.

The decrease in starch due to enzyme hydrolysis to maltose was from 0.0224 grams per ml. of solution to 0.0166 grams per ml. or a decrease of 0.0058 grams per ml.. The decrease may be expressed as:

$$(0.0058/0.0224) \times 100 = 25.9\%$$

and thus 25.9 percent of the starch, primarily amylose, was converted to maltose during the first 15 minutes of heating.

A starch calibration curve was prepared from the data of Table 2 using a 0.5 percent by weight starch solution by making dilutions ranging from 1 to 20 up to 1 to 80. The resulting starch standards contained from 63 micrograms to 250 micrograms per ml. of solution. Ten ml. of each standard was removed for the starch test and one-half ml. of 0.005 molar iodine solution was added to develop the blue coloration. The standards were also read on the Fischer Electrophotometer at 425mu wavelength and the curve drawn using the starch concentrations and the Fischer readings. The starch content of all samples was the determined by using the Fischer readings and the calibration curve.

Table 1

The effect of enzyme hydrolysis by alpha-amylase on a 2.5% starch solution

| Sample | Temp °F | Reaction time-min. | Fischer reading | μg Starch from curve | Starch g./ml. |
|---|---|---|---|---|---|
| 1 (control) | 80°(no enzyme) | 0 | 68.0 | 140 | 0.0224 |
| 2 | 112° | 5 | 62.0 | 122 | 0.0195 |
| 3 | 122° | 10 | 59.0 | 113 | 0.0181 |
| 4 | 133° | 15 | 56.0 | 104 | 0.0166 |
| 5 | 146° | 20 | 56.0 | 104 | 0.0166 |
| 6 | 167° | 25 | 56.5 | 105 | 0.0168 |
| 7 | 195° | 30 | 56.0 | 104 | 0.0166 |
| 8 | 211° | 35 | 56.0 | 104 | 0.0166 |

Table 2

Starch calibration curve

| Starch standard | Dilution of 0.5% solution | μg Starch per ml. | Fischer reading |
|---|---|---|---|
| 1 | 1 to 20 | 250 | 94.0 |
| 2 | 1 to 30 | 167 | 76.5 |
| 3 | 1 to 40 | 125 | 62.5 |
| 4 | 1 to 50 | 100 | 54.5 |
| 5 | 1 to 60 | 83 | 49.0 |
| 6 | 1 to 70 | 72 | 45.5 |
| 7 | 1 to 80 | 63 | 42.0 |

What is claimed is:

1. A stable, high protein citrus food product comprising at least about 50 percent by weight, based on the total weight of the composition, of full strength citrus juice or the equivalent thereof in citrus solids, about 1-6 percent by weight of glycoprotein material soluble at a pH of about 2-4, about 0.5 - 3.0 percent by weight starch which has been solubilized and partially hydrolyzed by heating in water at a temperature of about 210° - 260° F. for about 10-15 minutes, and about 0.1 - 1.0 percent by weight of a soluble food stabilizer.

2. A stable, high protein citrus food product comprising at least about 50 percent by weight, based on the total weight of the composition, of full-strength citrus juice or the equivalent thereof in citrus solids, about 1-6 percent by weight of glycoprotein material soluble at a pH of about 2-4, about 0.1 - 1.0 percent by weight of a soluble food stabilizer, about 0.5 - 3.0 percent by weight starch which has first been solubilized and partially hydrolyzed by heating in water at a temperature of about 210° - 260° F. for about 10-15 minutes, and subsequently further hydrolyzed and solubilized by heating for an additional about 5-15 minutes at a temperature of up to about 140° F. in the presence of about 0.1 - 0.15 weight percent, based on the starch, of α amylase enzyme, said enzyme then having been deactivated by raising the temperature above 140° F.

3. The citrus food product of claim 2 which contains about 2.0 - 3.0 weight percent of said starch.

4. The citrus food product of claim 2 wherein said additional heating is for about 10-15 minutes.

5. The citrus food product of claim 1 wherein said citrus juice is orange juice and is present in amounts of about 85-92 weight percent of the full-strength 14° Brix juice or the equivalent thereof of orange juice solids, based on the weight of the food product.

6. The citrus food product of claim 1 wherein said citrus juice is a high acid citrus juice and is present in amounts of about 54-57 weight percent of 6°-14° Brix juice or the equivalent thereof of orange juice solids based on the weight of the food product.

7. The citrus food product of claim 1 wherein said food stabilizer is a low viscosity anionic polymer derived from cellulose which is tolerant of low pH systems.

8. The citrus food product of claim 1 wherein said stabilizer is a sodium carboxymethylcellulose polymer having a degree of carboxymethyl substitution of about 0.65-0.85 D.S.

9. The citrus food product of claim 1 which contains about 2-9 percent by weight of a suitable sweetener.

10. The citrus food product of claim 9 wherein said sweetener is corn syrup.

11. The citrus food product of claim 2 which also contains 0.02 - 0.08 weight percent flavoring agents.

12. The citrus food product of claim 11 wherein said flavoring agents are selected from the group consisting of essence oil, cold-pressed oil and vanilla extract.

13. The citrus food product of claim 1 which has been dried to a crystalline solid.

14. The citrus food product of claim 2 which has been dried to a crystalline powder.

15. The citrus food product of claim 1 which has been heat stabilized at about 165° - 205° F.

16. The citrus food product of claim 1 which has been heat stabilized at about 165° - 205° F.

17. The citrus food product of claim 15 which has been further heated at a temperature of about 165° - 205° * F. to form a concentrate.

* * * * *